US010719793B1

(12) United States Patent
Smith et al.

(10) Patent No.: US 10,719,793 B1
(45) Date of Patent: Jul. 21, 2020

(54) LOCATION CONFIRMATION USING NETWORKED CLIENT PERIPHERALS

(71) Applicant: Applied Underwriters, Inc., Omaha, NE (US)

(72) Inventors: Justin N. Smith, Woodside, CA (US); Mark S. Nowotarski, Stamford, CT (US)

(73) Assignee: Applied Underwriters, Inc., Omaha, NE (US)

( * ) Notice: Subject to any disclaimer, the term of this patent is extended or adjusted under 35 U.S.C. 154(b) by 0 days.

(21) Appl. No.: 16/239,649

(22) Filed: Jan. 4, 2019

Related U.S. Application Data

(63) Continuation-in-part of application No. 15/055,673, filed on Feb. 29, 2016, now Pat. No. 10,210,482, which is a continuation-in-part of application No. 14/188,944, filed on Feb. 25, 2014, now Pat. No. 9,286,640.

(60) Provisional application No. 61/772,635, filed on Mar. 5, 2013.

(51) Int. Cl.
*G06Q 10/06* (2012.01)
*G06F 17/18* (2006.01)
*G06N 20/00* (2019.01)
*G08B 3/10* (2006.01)
*G06N 7/08* (2006.01)

(52) U.S. Cl.
CPC ..... *G06Q 10/063114* (2013.01); *G06F 17/18* (2013.01); *G06N 7/08* (2013.01); *G06N 20/00* (2019.01); *G08B 3/1016* (2013.01)

(58) Field of Classification Search
CPC .................................................. G06Q 10/06
See application file for complete search history.

(56) References Cited

U.S. PATENT DOCUMENTS

| 8,364,120 | B2 | 1/2013 | Kuhlman et al. |
| 8,914,383 | B1 * | 12/2014 | Weinstein ........ G06Q 10/06311 |
| | | | 707/749 |
| 8,959,030 | B2 | 2/2015 | Ricci |
| 8,959,044 | B2 * | 2/2015 | Posse ....................... G06N 5/02 |
| | | | 706/46 |
| 8,977,563 | B2 | 3/2015 | Burns |
| 9,020,848 | B1 | 4/2015 | Ridge et al. |
| 9,070,162 | B2 | 6/2015 | Cherry et al. |
| 9,154,301 | B2 | 10/2015 | Prehofer et al. |

(Continued)

FOREIGN PATENT DOCUMENTS

WO   WO 2012/110897 A2   8/2012

OTHER PUBLICATIONS

Bhat U.N. (2008) System Element Models. In: An Introduction to Queueing Theory. Statistics for Industry and Technology. Birkäuser Boston. Chapter 2, System Element Models, Oct. 30, 2018.

(Continued)

*Primary Examiner* — Fateh M Obaid
(74) *Attorney, Agent, or Firm* — Mark Nowotarski

(57) ABSTRACT

A system verifies whether or not an employee is actually on a job at a location during a standard time period, such as a work shift, by sending alerts to the employee's smart phone. The employee must respond to the alerts. The alerts are sent at random time intervals with a certain average rate. The average rate, called a Poisson parameter, can be varied over the course of a shift.

24 Claims, 14 Drawing Sheets

(56) References Cited

U.S. PATENT DOCUMENTS

| | | | |
|---|---|---|---|
| 9,250,085 B2 | 2/2016 | Hwang et al. | |
| 2002/0059090 A1* | 5/2002 | Yanagimachi | G06Q 10/10 705/320 |
| 2002/0194113 A1* | 12/2002 | Lof | G01W 1/10 705/37 |
| 2003/0149657 A1* | 8/2003 | Reynolds | G06Q 10/06 705/38 |
| 2003/0158772 A1* | 8/2003 | Harris | G06Q 10/06315 705/7.25 |
| 2003/0177057 A1* | 9/2003 | Aronowich | G06Q 10/06315 705/7.31 |
| 2004/0015424 A1* | 1/2004 | Cash | G06Q 10/06375 705/35 |
| 2007/0150328 A1* | 6/2007 | Koide | G06Q 10/06375 705/7.25 |
| 2008/0114683 A1* | 5/2008 | Neveu | G07C 1/10 705/50 |
| 2010/0161462 A1 | 6/2010 | Pappas et al. | |
| 2012/0022897 A1 | 1/2012 | Shafer | |
| 2012/0060112 A1 | 3/2012 | Wilson et al. | |
| 2012/0123806 A1 | 5/2012 | Schumann, Jr. et al. | |
| 2012/0271651 A1 | 10/2012 | Gilbert et al. | |
| 2012/0330881 A1 | 12/2012 | Jamal et al. | |
| 2013/0005352 A1 | 1/2013 | Jones et al. | |
| 2013/0006718 A1 | 1/2013 | Nielsen et al. | |
| 2013/0024334 A1 | 1/2013 | Kozlay | |
| 2013/0030844 A1 | 1/2013 | Pendergrass et al. | |
| 2013/0085796 A1 | 4/2013 | Ruffolo | |
| 2014/0279672 A1 | 9/2014 | Liu | |
| 2015/0169729 A1* | 6/2015 | Kumano | G06F 21/6245 707/738 |
| 2016/0196524 A1* | 7/2016 | Ito | G06Q 10/10 705/7.14 |
| 2018/0025309 A1* | 1/2018 | Absher | G06Q 10/06311 705/7.14 |

OTHER PUBLICATIONS

A E Dembe, J B Erickson, R G Delbos, S M Banks; The impact of overtime and long work hours on occupational injuries and illnesses: new evidence from the United States, Occup Environ Med 2005;62:588-597. doi: 10.1136/oem.2004.016667, www.occenvmed.com, dated Mar. 8, 2005.

en.wikipedia.org, Diffusion of innovations, https://en.wikipedia.org/wiki/Diffusion_of_innovations, Oct. 28, 2018.

en.wikipedia.org, Failure rate, https://en.wikipedia.org/wiki/Failure_rate, Oct. 28, 2018.

en.wikipedia.org, Probability density function, https://en.wikipedia.org/wiki/Probability_density_function, Oct. 28, 2018.

en.wikipedia.org, Survival analysis, https://en.wikipedia.org/wiki/Survival_analysis, Oct. 28, 2018.

en.wikipedia.org, Weibull distribution, https://en.wikipedia.org/wiki/Weibull_distribution, Oct. 28, 2018.

ADP; ADP Mobile Solutions—Support Page; http://www.adp.com/mobilesolutions/support.aspx; last viewed Jan. 27, 2014.

ADP; ADP Mobile Solutions, Mobile Product Employee, Mobile HR Services; http://www.adp.com/mobilesolutions/employee/; last viewed Jan. 27, 2014.

en.wikipedia.org, Defense Contract Audit Agency; https://en.wikipedia.org/wiki/Defense_Contract_Audit_Agency; last viewed Jan. 29, 2014.

epaysystems.com; Employee Self Service Features; http://www.epaysystems.com/employee-self-service/; last viewed Feb. 19, 2014.

Certusview; e-Sketch, Certus View; http://certusview.com/e-sketch-application/; last viewed Feb. 19, 2014.

Exaktime Mobile; ExakTime Mobile Mobile Time Clock; http://www.exaktime.com/mobile-time-clock; last viewed Jan. 27, 2014.

Flowfinity; Security Guard Management; http://www.flowfinity.com/solutions/security-guard-management.aspx 1 of; last viewed Jan. 29, 2014.

True Wireless, Inc.; 4 Mobile Time Clock Apps for Business; http://truewirelessinc.com/mobile-workforce/4-mobile-time-clock-apps-f... 1 of; dated May 28, 2013; last viewed Jan. 27, 2014.

android.gadgettouch.com; GPS Punch!-Tracking Ugly, Lazy Employees With This Free Application; http://android.gadgettouch.com/GPS-Punch-Tracking-ugly-lazy-employe... 1 of; dated Sep. 20, 2012; last viewed Jan. 28, 2014.

Kronos Incorporated; Workforce Ready Time & Attendance; last viewed Jan. 28, 2014.

Kronos Incorporated; Atlanta Public Schools Interfaces Kronos Timekeeping to Improve Position Control and Workforce Management; last viewed Jan. 28, 2014.

Software Advice, Inc.; Case Study: Kronos Helps Sulco Warehousing & Logistics and Lancer Transportation Manage Employee Time and Attendance; http://new-talent-times.softwareadvice.com/case-study-kronos-0713/; dated Jul. 3, 2013; last viewed Jan. 28, 2014.

The Sleeter Group; Manage Payroll from your iPhone or iPad with Intuit Online Payroll Mobile; http://www.sleeter.com/blog/2011/05/manage-payroll-from-your-iphone-... 1 of; dated May 24, 2011; last viewed Jan. 27, 2014.

VDCRESEARCH; Mobile & Wireless Practice; Mobile HR Solutions: Connecting & Empowering Your Workforce; dated May 2011, last viewed Jan. 31, 2014.

American Optometric Association; ARBO releases new OE Tracker mobile app for smartphones; http://newsfromaoa.org/2013/03/22/arbo-releases-new-oe-tracker-mobile... 1 of; dated Mar. 22, 2013; last viewed Jan. 28, 2014.

Pacific Timesheet; Contruction Timesheets Track everything in one place!; http://www.pacifictimesheet.com/timesheet_products/pacific_timesheet_...; last viewed Jan. 29, 2014.

Pacific Timesheet; DCAA Compliance and Sarbanes-Oxley; http://www.pacifictimesheet.com/timesheet_products/pacific_timesheet_... 1 of; last viewed Jan. 29, 2014.

Freedom Telecare, LLC; Frequently Asked Questions; http://timesheetmobile.com/employee-tracking-frequently-asked-questio... 1 of; last viewed Jan. 29, 2014.

Tsheets Time Tracker; TSheets We Love Employees; http://www.tsheets.com/crew-time-card-app.php; last viewed Jan. 29, 2014.

Oregon Health & Science University; TTE User Guide; Telephone Time Entry (TTE); Rev. Jan. 2012, last viewed Mar. 8, 2013.

employeetimeclocks.com; uAttend SmartPhone iPunch App SmartPhone Punch Clock; http://www.employeetimeclocks.com/prdct523-uattend-iphone-android-a... 1 of; last viewed Feb. 19, 2014.

WKRCOMPLLC; Workers' Compensation iPhone App Calculator; http://www.wkrcomp.com/app.php; last viewed Feb. 19, 2014.

en.wikipedia.org; Poisson process; https://en.wikipedia.org/w/index.php?title=Poisson_process&oldid=466984482; last viewed Nov. 21, 2014.

\* cited by examiner

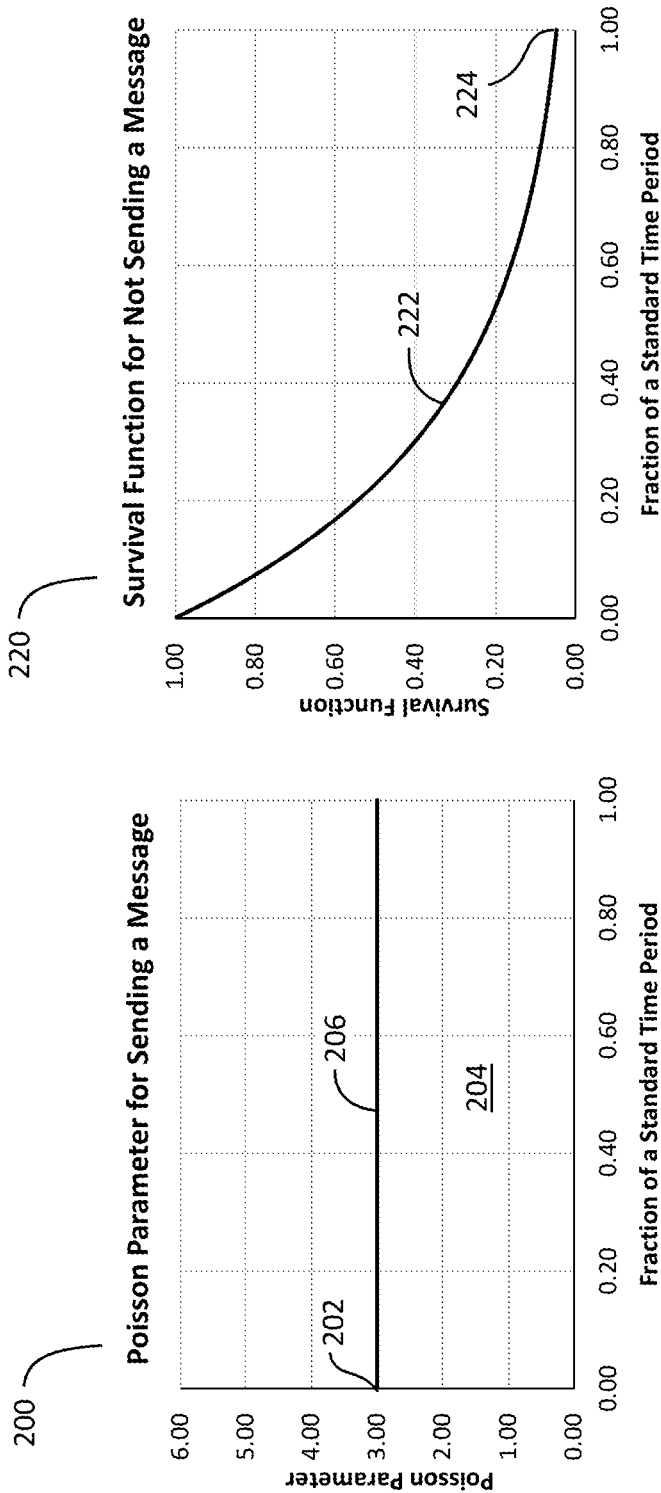

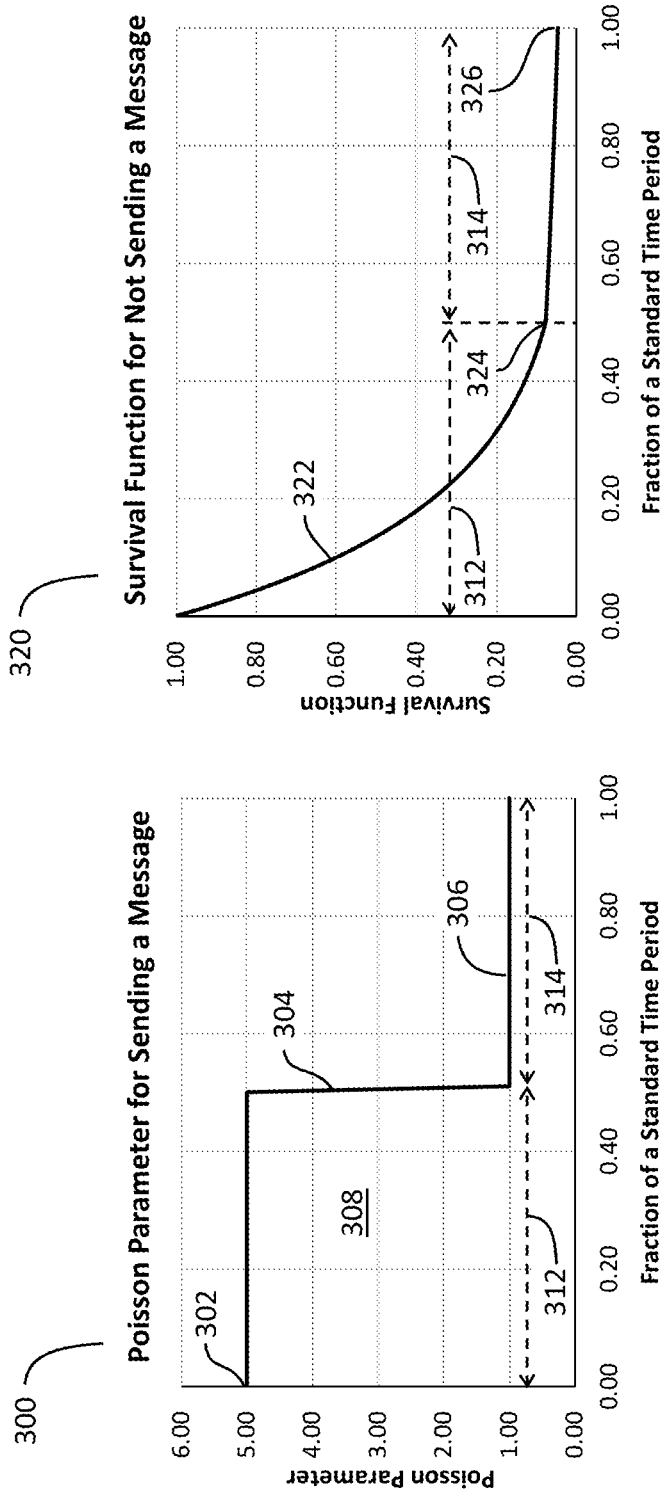

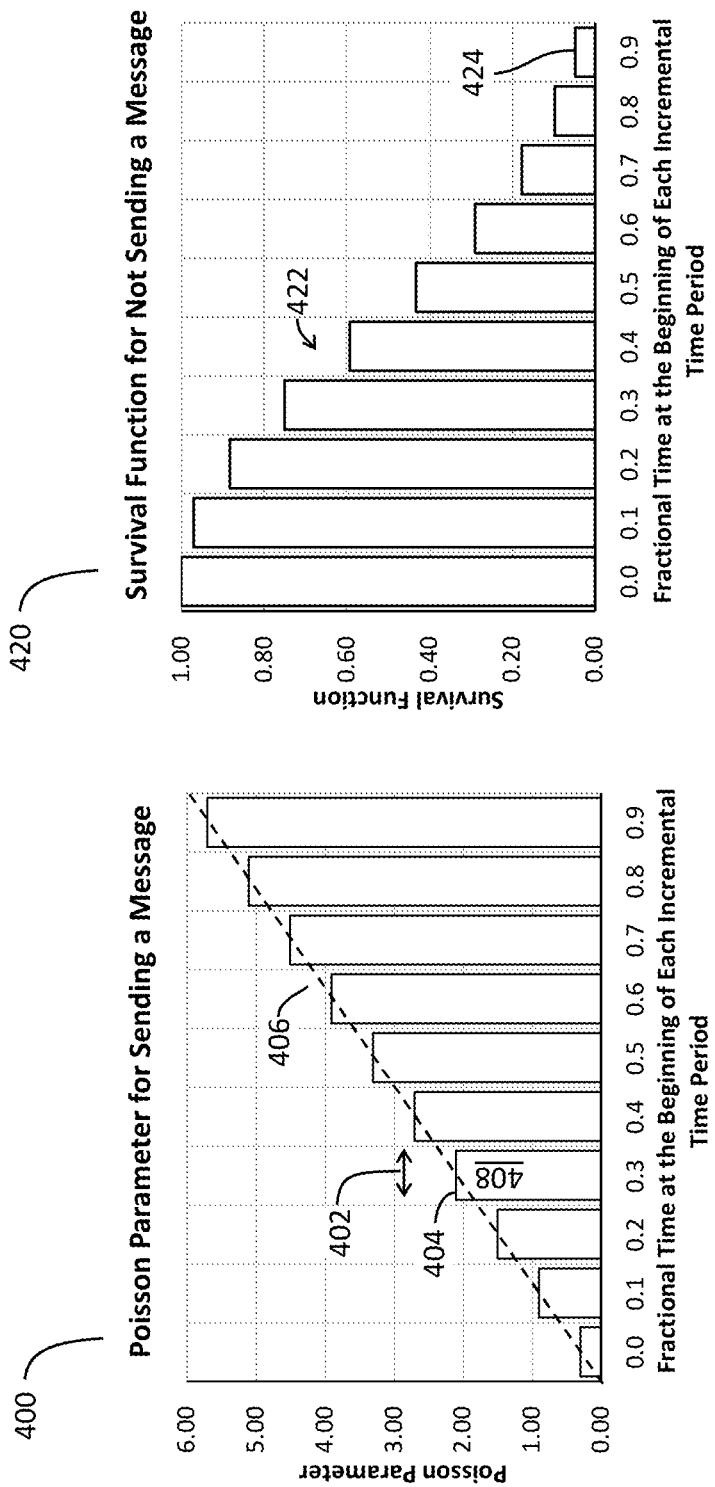

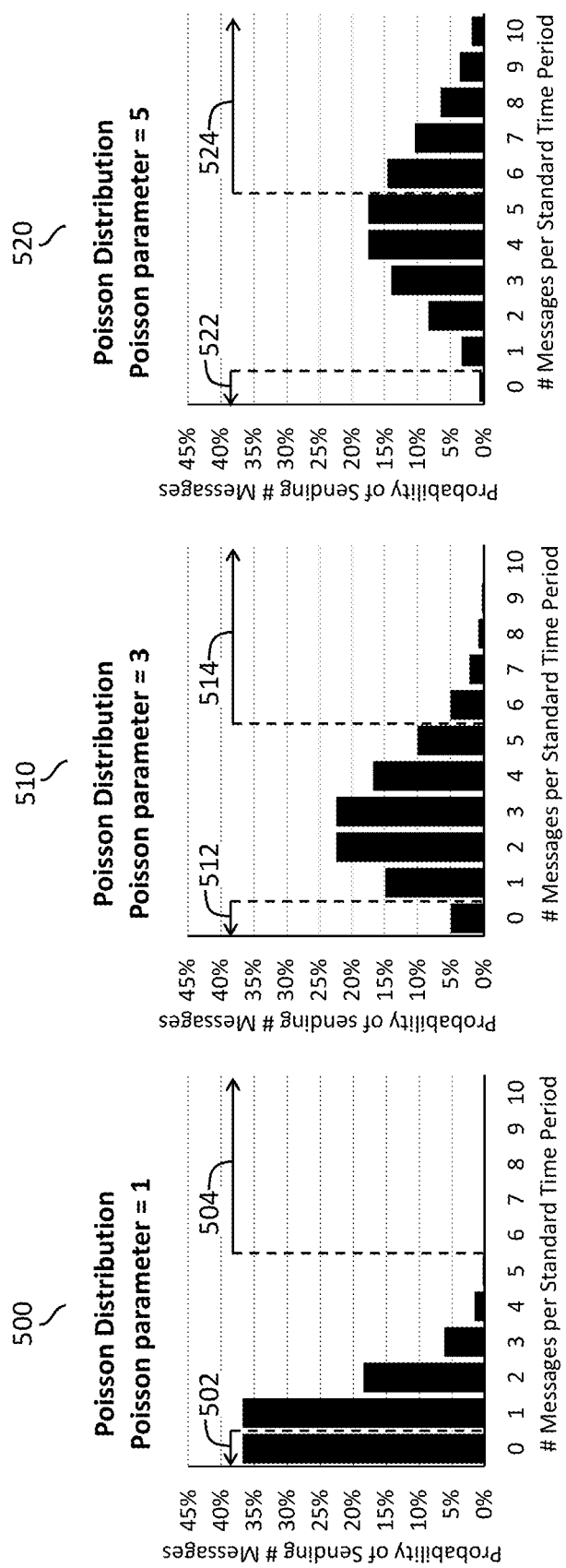

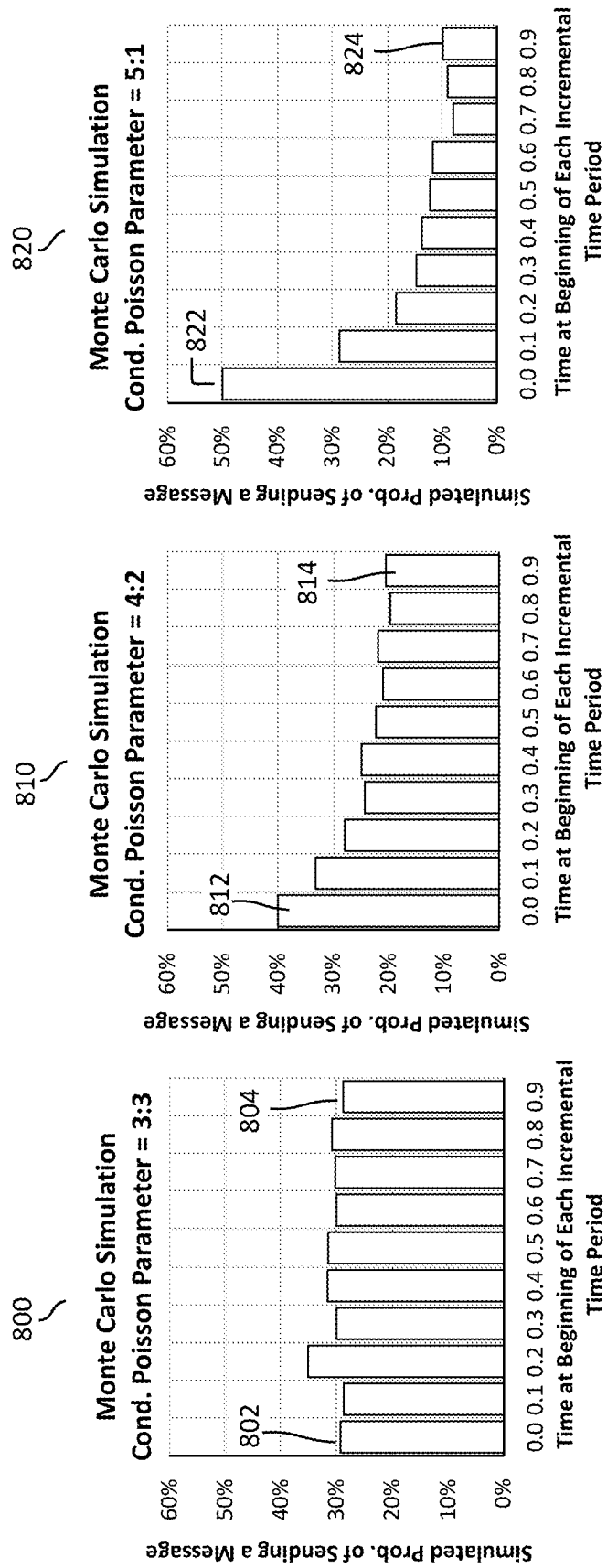

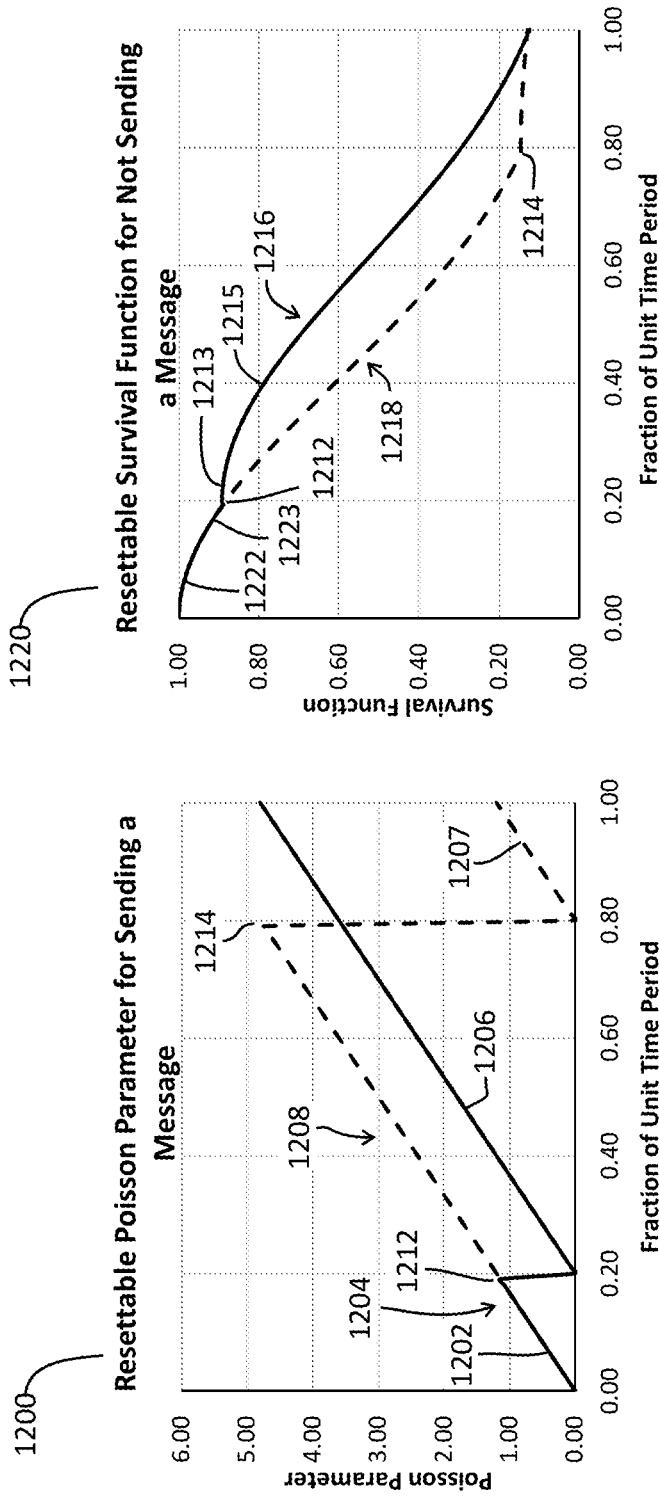

US 10,719,793 B1

LOCATION CONFIRMATION USING NETWORKED CLIENT PERIPHERALS

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

Smartphone Attendance Monitoring

Payroll companies provide payroll services to one or more client companies. A client company's employees are usually expected to work at defined locations between certain times. The location may be within an office, a factory, or some other defined area. Monitoring actual attendance is difficult. Moreover, specific locations and times of attendance may have a complicated relationship with the wages and benefits earned, especially for hourly paid employees.

A typical payroll company will allow a client to specify workers and job locations, but will require direct input of data on hours worked by employee by pay period at various locations, with separation of hours into various time codes, such as: regular, overtime, or double-time. Separate time-management software is available which can compute these aggregates from records of more basic data on clock-in and clock-out times. Some payroll companies may even have software that combines time-management tools with payroll data collection and processing.

Time management systems are easiest for the client company to use when employees themselves can perform clock-in and clock-out events using a system that collects this data centrally. However, to date this has only really been practical for employees in office environments who work at networked computers all day. Software can be put on a networked computer to handle the clocking events and, if the software cannot be installed elsewhere, there is some limited assurance that the employee who is supposed to be doing the work is the one who is clocking in and out.

However, many workers do not work at computers often. This includes many types of workers with complicated payroll requirements, for example construction workers, electricians, and other blue-collar trades. The complications for these workers start with overtime calculations. Rules regarding overtime and other shift payments are often complex. Overtime may include hours worked beyond a set total per day as well as per week or pay period, and may also include hours worked outside a preset shift or hours beyond a certain continuous interval without a break. Many of these workers divide their time between job sites that may have different payroll-related requirements. For example, workers near a state boundary may work some hours in a neighboring state, and may be subject to different reporting requirements by the state.

Requirements may also be complicated within states. For example, workers' compensation premiums for many construction workers in New York State must be computed differently based on the number of hours worked in each county. Minimum wage requirements vary by state, county and sometimes also municipality, and must typically be obeyed for the work done in each location. Recording and entering all the required data for such workers is typically onerous. There is a need therefore, for a system that will verify whether or not a worker is actually on the job in variable and remote locations.

SUMMARY OF THE INVENTION

FIG. 1 shows the various possible relationships for a system 100 comprising physical devices used in a proposed payroll management process. Horizontal bar 102 represents the internet. Direct internet connections (wired or wireless) are shown by solid connecting lines. Above the horizontal bar are a payroll company's server 104 and third-party satellite(s) 106 used in a location checking process. Said server may be referred to as a first server. Said payroll company may be referred to as a second person. All items shown below the horizontal bar are located with the client company's employees. Any one of said employees may be referred to as a first person. The items may be owned by the client, or by the employees, or by a payroll company. Ownership of the devices is unimportant. Special software, which may be owned and distributed by the payroll company, may be used to configure the various devices to perform the required tasks. Items in 112, 114 and 116 are exemplary employee work locations. Items 122 and 124 are telecommunication devices that are with employees when they are at work. Specific labeled items are:

- The payroll company's central server 104 comprising a store of master payroll and benefit records linked as needed to other payroll company systems for billing, printing, insurance management, etc.
- The internet 102 or other computer-to-computer communications networks, such as M-2-M, digital cell phone, analog cell phone, wired, fiber optic, or other network. As used herein, a "computer" refers to a digital electronic device that comprises a microprocessor, input device, output device, permanent memory and computer readable instructions stored within said permanent memory, said computer readable instructions being operable to cause said microprocessor to physically read in data from said input device, process said input data and generate output data to control said output device. Servers, smart phones, and all digital computing devices described herein comprise a computer.
- A client employee's phone 122 with an active internet link but not located at a defined jobsite.
- A client employee's smartphone 124 without an active internet link and not located at a defined jobsite.
- A client's truck 114 driven by an employee with a smartphone 115 in his/her possession.
- A client's factory 116 where an employee is at work with his/her smartphone 117.
- A client's office location 112 where various employees and peripherals are located.
- A local area network (LAN) hub 132 located in the client's office. All peripherals connected to this hub can be considered to be at a work location.
- An employee's work computer 134 connected to the LAN at his/her office.
- A Wi-Fi hub 136 (WAN) connected to the office LAN. Peripherals connected to the Wi-Fi hub can be considered to be at a work location.
- The limit range 138 of the Wi-Fi network.
- An employee's computer 142 connected to the WAN.
- An employee's smartphone 144 connected to the WAN.
- A client manager's computer 146 connected to the LAN.

A satellite 106 forming part of a location tracking system, such as GPS, which can be used by smartphones and similar peripherals.

BRIEF DESCRIPTION OF DRAWINGS

FIG. 2A is a graph of Poisson parameter versus fraction of a standard time period where the Poisson parameter has a constant value.

FIG. 2B is a graph of a survival function associated with the Poisson parameter of FIG. 2A.

FIG. 3A is a graph of Poisson parameter versus fraction of a standard time period where the Poisson parameter has a first value during a first incremental time period and a second lower value during a second incremental time period.

FIG. 3B is a graph of a survival function associated with the Poisson parameter of FIG. 3A.

FIG. 4A is a graph of Poisson parameter versus time illustrating digital implementation.

FIG. 4B is a graph of a survival function associated with the Poisson parameter of FIG. 4A.

FIGS. 5A to 5C are graphs of the Poisson distribution associated with different values of a Poisson parameter.

FIGS. 8A to 8C are graphs of Monte Carlo simulations of the probability of a message being sent in the different incremental time periods for different values of conditional Poisson parameter pairs.

FIG. 12A is a graph of a resettable Poisson parameter versus time.

FIG. 12B is a graph of a resettable survival function versus time.

DETAILED DESCRIPTION

Figure 1:
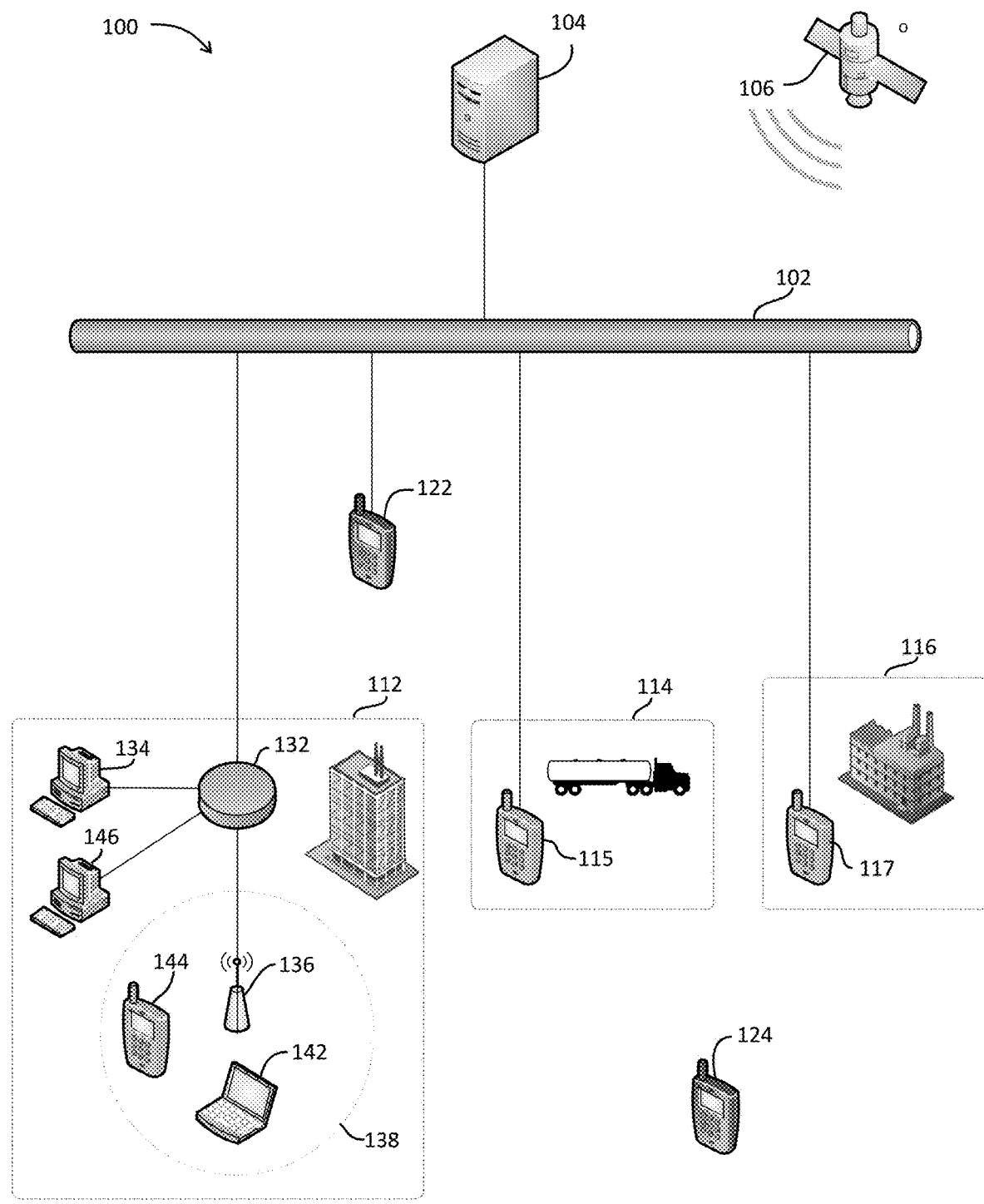
FIG. 1 is a schematic of a system for monitoring employee location.

The detailed description describes non-limiting exemplary embodiments. Any individual features may be combined with other features as required by different applications for at least the benefits described herein. As used herein, the term "about" means plus or minus 10% of a given value unless specifically indicated otherwise.

Smartphone Attendance Monitoring A way around the difficulties described herein is to put attendance management software on smartphones or other personal programmable communications devices which employees then keep in their possession while they work. Most employees already carry sufficiently capable smartphones. The software controlling said smartphones will do the following:

1. The software will allow the employee to "clock in" and "clock out" when the phone is within a defined acceptable area and time shift. "Clocking in" means a first person has indicated that said person has begun work or other task. "Clocking out" means that said first person has ceased said work or task.

2. The software will send all collected data via an internet, cellular network or other communications means to a payroll company's server (i.e. the "first server").

3. The payroll company's server will collect all data and send necessary data and reports back to the client and its employees. Data may be transmitted directly from one client peripheral to another insofar as those peripherals form part of the internet link. All communication through such peripherals will be encrypted to prevent the client from bypassing any system controls.

4. The employer (aka a "second person") may define acceptable location areas for working, for example, by drawing perimeters on a map in software maintained by the payroll company, or by specifying acceptable network connections to, for example, Wi-Fi servers located at a job site.

5. The employer may also define schedules for each employee.

6. The presence of a first person within an acceptable area may be assessed in one of the following ways or combinations thereof:

a. The phone (or similar device) may have access to a satellite-driven location system, such as GPS, which the software on the phone will access, and then compare against the perimeters of said acceptable location area.

b. The phone may allow the software to use triangulation data from local cellphone towers, which the software will compare against the acceptable perimeters.

c. The phone may connect to a Wi-Fi or wired network that the employer has designated to be acceptable. For example, a Wi-Fi network operating within a warehouse building. Such networks are especially useful because they often exist in locations where wireless phone, GPS or other external wireless signals are inaccessible. These locations include strongly constructed concrete buildings or other buildings that are shielded from said external wireless signals. They also include routes that a worker should be on that is shielded from GPS signals by large buildings.

7. The specific phone location will be monitored at regular short intervals between clock-in and clock-out events, and transmitted automatically to the payroll company's server. Time spent within each significant area for payroll purposes will be computed automatically by a machine attached to the payroll company's server. The amount of "clocked" time spent outside defined worksites will be transmitted to the client, so said client can consider taking action against employees who spend too much time away from work.
8. A surprising benefit of collecting this data for the client is a possible reduction in workers' compensation (WC) liabilities and fraud. To be compensable under WC rules, an employee must suffer injury arising in the course of and arising out of their work. So, an employee would generally be covered for injuries suffered while traveling between assigned worksites. Said employee would not be covered if he/she made a detour, for example, on the way to run a personal errand. The location data tracked by the software could be used to identify such injuries that were not in an acceptable work area.
9. A further surprising benefit of the system derives to the payroll company directly. Hours to be worked may be required to be scheduled in advance and sent to employees' devices via the payroll company's server. The payroll company will then have advance notice before any employee is employed. This prevents a common type of fraud whereby an employer pays a worker "under the table" unless and until that worker is injured and wishes to make a WC claim, at which point the employer announces to the payroll company and WC insurance provider that the worker has "just" been hired.

While much of the description above supposes the use of smartphones as the peripherals carried by employees, other personal programmable communications devices could be used including smart watches, tablet computers, or laptop computers. Similar software could also be rolled out for desktop computer users so that all of a client's employees have access all the time to the payroll system through the peripheral that would typically be their "computer of choice". This includes regular office workers who typically sit at desktop computers, and workers who sometimes travel and sometimes stay at their desk, such as supervisory staff. Analog systems may also be used with proper circuitry design to provide the above-described functionality without digital programming.

Mobile Employees and Distance Traveled

Certain employees do not work at fixed worksites. These include, for example, traveling salespersons and truckers. These employees pose unique challenges and opportunities to the system.
1. Many smartphones, tablet computers and other peripherals have access to satellite-driven location-tracking systems such as GPS. A module could be added in to the payroll company's software to allow specifying routes by an employer (i.e. a second person) that an employee (i.e. a first person) should follow on the job. For example, a trucker might be expected to drive from San Francisco to Phoenix on a given day. GPS tracking data recorded by the software in the trucker's smartphone could be used to monitor completion of assigned routes.
2. Timekeeping along a set route may or may not be important to the client. Some employees are paid piece rates by distance traveled. For these employees, data from a vehicle odometer is often used to compute wage amounts, and would likely be preferred over data from the smartphone. The smartphone could still be used to find employee locations at any given time, and to provide data that is readily accessible to systems that prepare performance management reports.
3. Some employees are expected to travel as far as possible but do not have set routes, or have very complex routes. These employees may or may not be in vehicles equipped with odometers. For example, this category includes security guards, local delivery drivers, tractor drivers, yard workers, and cleaning staff. For these workers, the client may specify that the payroll company's server produce a regular report that breaks down the total distance traveled by employee by pay period.
   a. This category of employee may include some who are expected to be mobile, but within a large jobsite, such as field workers on a farm. These workers could be subject to distance-traveled reporting and also worksite attendance checking.
4. Additional benefits from data on distance traveled may accrue through the WC rate setting process. The benefits include:
   a. Using data on distance traveled by employees, it may be possible to identify subclasses of employees within traditional workers' compensation rating classes that have a characteristically greater or lesser exposure to risk of injury in accordance with differences in travel distance or pattern. For example, it might be found that pizza delivery workers travel further and faster than other delivery drivers.
   b. Using data on distance traveled by employees, the payroll company can check for undesirable work patterns and fraud by the client in the description of its business and the activities of its employees. To continue the prior example, if a pizza shop has described itself as not doing any delivery, then its workers should not travel far on the job. Material inaccuracies in descriptions given to the insurer in the initial application for insurance may be sufficient grounds for cancellation or non-renewal of the client, which provides a benefit via reduced losses to the insurer.

Employee Access to Payroll and Benefit Data

Since every employee of the client will have software from the payroll company on a peripheral device in their possession with some access to the payroll company's server, it is natural to provide some employee access to wage and benefit data. This would typically include schedules, hours worked, wages earned, or benefits accrued. This personal information is typically kept confidential to an employee. By "confidential to a person" (e.g. an employee), it is meant at least that the information is not available through a simple search of the internet, such as using a Google search engine. Providing this personal financial data may have a surprising side benefit. The employee will need to have a method to verify his/her identity to access such data, which may be a PIN or password or similar standard protocol comprising a personal security code.

For various actions within the payroll system, an employer needs to ensure that the employee is performing said various actions and not another user fraudulently acting on said employee's behalf. These actions include clocking in, clocking out, and responding to audit inquiries. By using the same login protocol for these actions as for access to the employee's confidential personal data, said fraud can be substantially discouraged. Most employees will weigh the cost of providing access to their confidential personal data as being larger than the benefit of being able to defeat the attendance-checking routines.

Active Attendance Audits So far, we have simply presumed that employees remain present with the peripherals used to monitor their location throughout the periods of time when they are recorded as being in attendance. We can add mechanisms to encourage full attendance by auditing this behavior.

1. The payroll company server may at intervals send a message to the employee's peripheral, which causes the software on that peripheral to issue an audible and/or visible alert to the employee. The employee must respond by entering a secret code (e.g. security code) within a specified time interval. If the code is not entered, the employee's attendance will be provisionally struck out and the employer will be informed.
2. The employer may choose any action, including letting the strike-out stand or overturning it, and/or implementing their own separate punishment actions.
3. The time allowed for entry of the secret code should be long enough to allow for workers to put down tools safely or return from a short break. Ten minutes is adequate in many situations, although this and other parameters could be variable by employee at the second person's (e.g. employer's) discretion. Said functionality can be built into the first server (e.g. payroll server).
4. The secret code should be one that employees will not willingly share with their fellows, to discourage fraud. Suitable codes could include: the employee's social security number (SSN); or the personal identification number (PIN) or password used to access the employee's payroll and benefit data in the payroll company's system or other confidential financial data.
5. The interval between messages being sent out could be random, following, for example, a Poisson process, where the Poisson parameter is settable by employee or employee type and is under the ultimate control of the second person (e.g. employer) and not the first person (e.g. the employee). This can be implemented by setting various permissions in the first server.
6. Messages could also be sent out at specific times as requested by the client.
7. The client's manager's access to the payroll company's software would include tools for managing and monitoring the results of attendance audits.

All data communications from client peripherals to the payroll company's server should be strongly encrypted.

Poisson Parameter

The Poisson parameter may be a function of time. It may be a fixed function of time or it may vary in response to certain events, such as whether or not an employee has received a prior message validating location during a standard time period, such as an eight-hour shift.

FIG. 2A is a graph 200 of Poisson parameter 206 versus fraction of a standard time period, where the Poisson parameter has a constant value 202. A Poisson parameter versus time is also known as a hazard function. When a Poisson parameter is constant over time, it can be described as a Weibull distribution with a shape parameter of 1. Weibull distributions with larger and smaller shape parameters may be used. A Weibull distribution with a shape parameter greater than 1 will have a Poisson parameter that increases over time. This is useful in situations where one wants to minimize the disturbance of an employee immediately after a standard time period has begun.

The value of the Poisson parameter in this example is about 3. The fraction of a standard time period varies from 0 to 1. The average number of messages that would be sent to an employee during a standard time period is the area 204 under the curve 206. In this example, the area, and hence the average number of messages, would be 3. That may be a suitable number to reasonably verify employee presence at a job location during a standard time period. Too many messages will unduly interrupt the employee. Too few will not adequately verify presence. A value of the Poisson parameter between 1 and 10 may be suitable depending upon the nature of the work being monitored.

FIG. 2B is a graph 220 of a survival function 222 associated with the Poisson parameter of FIG. 2A. A survival function is defined herein as the fraction of employees that would not receive a message by a certain time. In this example, even though the average number of messages is 3, there is still a finite probability 224 that an employee will not receive a message by the end of a standard time period. In this example, based on Poisson statistics, the value of the survival function at the end of a standard time period is about 5%. Thus about 1 out of 20 times, an employee will receive no message during a shift. In some situations, this value may be too high. For example, the messages may be used to not only verify that an employee is on the job at a location, but also to verify that the employee is not injured or otherwise incapacitated. Thus, a lower value of the survival function may be desired at the end of a standard time period. Methods for achieving this without overburdening employees with messages will be discussed below with reference to a conditional Poisson parameter.

FIG. 3A is a graph 300 of Poisson parameter 304 versus fraction of a standard time period where the Poisson parameter has a first value 302 during a first incremental time period 312 and a second lower value 306 during a second incremental time period 314. In this example, the first value is about 5, the second value is about 1, the first incremental time period is the time fraction 0.0 to 0.5 and the second incremental time period is the time fraction 0.5 to 1.0. The area 308 under the curve is about 3. Thus, the average number of messages that an employee will receive during a standard time period in this example is the same as the example of FIG. 2A where the Poisson parameter has a constant value of 3. A Poisson parameter that starts at a high value and then goes to a low value may be useful when it is most important to verify that an employee is on the job during the first portion of a shift while also making sure that there is at least a small but reasonable chance that the employee will get a message during a second portion of the shift.

FIG. 3B is a graph 320 of a survival function 322 associated with the Poisson parameter of FIG. 3. The graph shows that, in this example, there is a probability 324 of about 8% that an employee will not get a message during the first incremental time period 312 and a probability 326 of about 5% that the employee will not get a message during the entire standard time period. The ratio of the value of the survival function at the end of the second incremental time period to the value of the survival function at the end of the first incremental time period indicates the probability that an employee will not receive a message during the second incremental time period 314. The ratio is about 0.63. Thus, there is about a 63% chance that an employee will not receive a message during the second incremental time period. This corresponds to about a 37% chance that the employee will receive at least one message during the second incremental time period. This should be high enough so that the employee will understand that there is a reasonable probability that said employee will receive a message during the second time period. A chance of 10% or greater would be considered adequate for there to be reasonable probability that the employee will receive a message during the second incremental time period such that said employee would not expect that there will be no messages sent during the second incremental time period.

Digital Implementation

FIG. 4A is a graph 400 of Poisson parameter versus time illustrating digital implementation. The standard time period is divided into 10 incremental time periods with equal duration 402. The duration is expressed as a fraction of the standard time period. In this example the duration is 0.1. The duration can be any value of 1 or less. Each incremental time period is labeled by the fractional time at the beginning of each incremental time period. There is a value 404 of a Poisson parameter associated with each incremental time period. In this example, the successive values of Poisson parameter form a linearly increasing relationship 406 with respect to fractional time. This corresponds to a Weibull distribution with a shape parameter of 2 and a scale parameter of 6. As used herein, the scale parameter of a Weibull distribution is defined as the value of the Weibull distribution at a fraction of the standard time period of 1. This is different than, but nonetheless compatible with, other conventional definitions for the scale parameter of a Weibull distribution.

The linearly increasing relationship may be suitable in situations where it is important to verify that an employee is on the job towards the end of the standard time period while minimizing the disturbance of the employee immediately after the beginning of the standard time period. Any relationship between Poisson parameter and time can be used depending upon a particular application. Machine learning can be built into the system to automatically adjust the Poisson parameters of different incremental time periods when the frequency of employees failing to respond to messages during certain critical incremental time periods indicates an increased need to verify that an employee is on the job during said critical incremental time periods.

Figure 9:
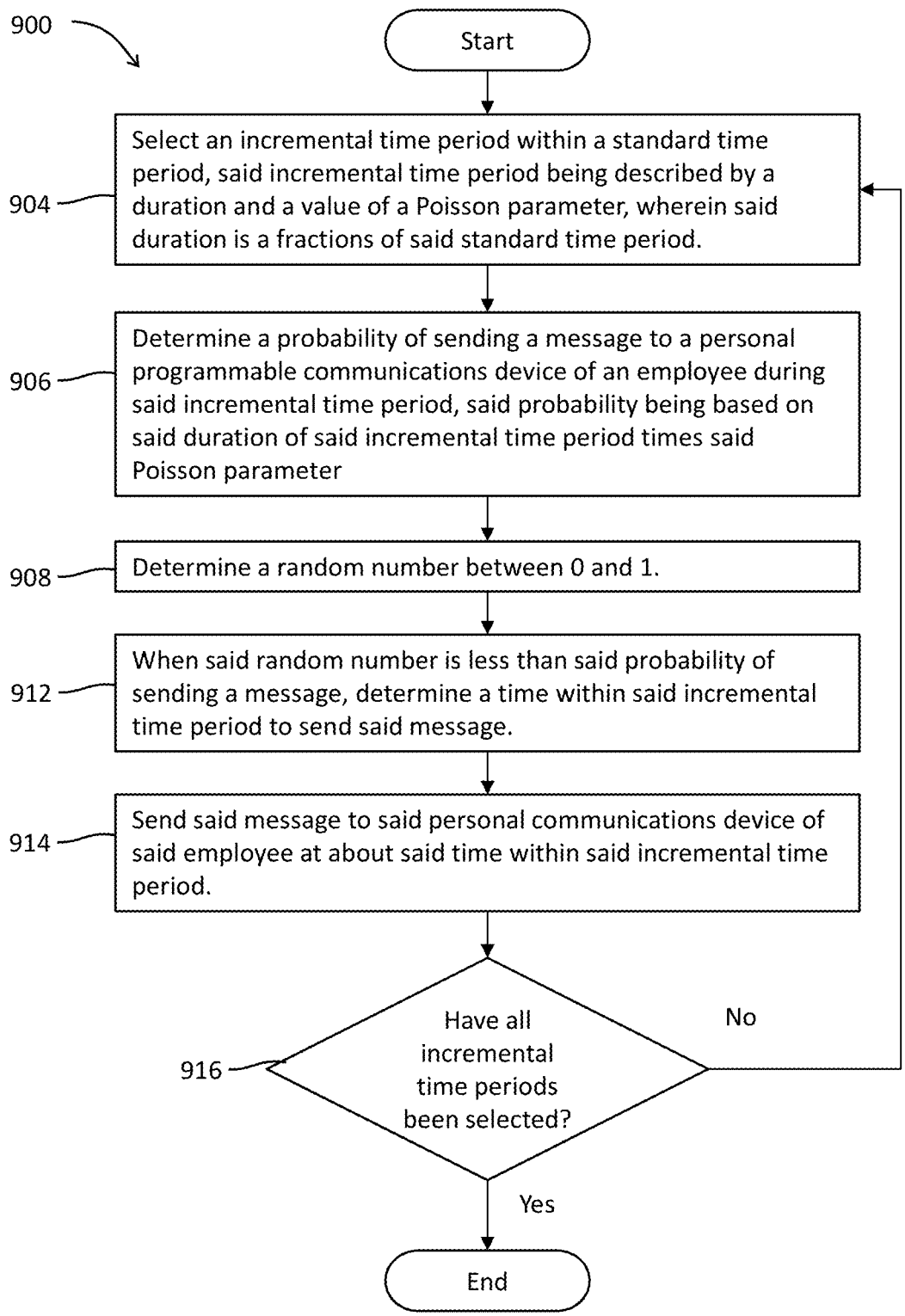
FIG. 9 is a flow chart of the steps to determine when a message is sent to an employee's personal programmable device for a constant Poisson parameter.

Computationally efficient implementation is important to minimize the consumption of computing resources, particularly when very large numbers of employees are tracked simultaneously. Referring to system 100 of FIG. 1 and steps 900 of FIG. 9, a system directed to the practical application of automatically verifying in a computationally efficient manner whether or not an employee is actually on a job at a location during a standard time period comprises:
  a) a personal programmable communications device (e.g. items 122, 134, 146, 144, 142, 115, 117, or 124) that is with said employee when said employee is on said job; and
  b) a first server (e.g. item 104) that is in digital communication (e.g. item 102) with said personal programmable communications device
  wherein:
  c) said first server is modified to automatically carry out the steps 900:
    1) select 904 an incremental time period within said standard time period, said incremental time period being described by a duration and a value of a Poisson parameter, wherein said duration is a fraction of said standard time period;
    2) determine 906 a probability of sending a message to said personal programmable communications device during said incremental time period, said probability being based on said duration of said incremental time period times said Poisson parameter;
    3) determine 908 a random number between 0 and 1;
    4) when said random number is less than said probability of sending a message, determine 912 a time within said incremental time period to send said message; and
    5) send 914 said message to said personal programmable communications device at about said time within said incremental time period
  and wherein:
  d) said message is operable to physically cause said personal programmable communications device to issue an audible sound; and
  e) said personal programmable communications device is operable to receive a security code from said employee in response to said audible sound to confirm that said employee is on said job at said location during said incremental time period.

The steps 904 to 914 may be repeated 916 until all incremental time periods have been selected.

Each incremental time period can be described by an incremental Poisson parameter 408. The incremental Poisson parameter is equal to the duration 402 of the incremental time period times the value of the Poisson parameter 404 for said incremental time period. The probability of sending a message during said incremental time period is equal to 1 minus the survival function of a Poisson distribution based on the incremental Poisson parameter. When the value of the incremental Poisson parameter is 0.3 or less, then the probability of sending a message during the incremental time period can be approximated as the value of the incremental Poisson parameter. This reduces the computational requirements of determining the probability of sending a message.

FIG. 4B is a graph 420 of a survival function 422 associated with the Poisson parameter of FIG. 4A. The average value of the Poisson parameters of the digital implementation shown in FIG. 4A is about 3. Hence, the value of the survival function 424 at the end of the last incremental time period ("0.9") is about 5%.

Conditional Poisson Distribution

FIGS. 5A to 5C are graphs 500, 510 and 520 of the Poisson distributions associated with different values of the Poisson parameter. The graphs are bar charts showing the probability of sending a certain number of messages (i.e. "# messages") to an employee during a standard time period versus the number of messages actually sent. The Poisson parameter associated with each graph is displayed in the respective titles of the graphs. FIG. 5A shows the distribution for a Poisson parameter of 1. FIG. 5B shows the distribution for a Poisson parameter of 3. FIG. 5C shows the distribution for a Poisson parameter of 5.

One of the design goals of a system directed to the practical application of automatically verifying whether or not an employee is actually on the job at a location during a standard time period is to make sure that the employee is sent at least a lower threshold number of messages during the standard time period without sending more than an upper threshold number of messages during the same standard time period. The lower threshold might be 1. The upper threshold might be 5. A "lower threshold exception" is when the total number of messages sent to an employee during a standard time period is less than the lower threshold. Similarly, an "upper threshold exception" is when the total number of messages sent to an employee during a standard time period is greater than the upper threshold.

A user of the system may specify a "lower threshold ceiling". The lower threshold ceiling is the maximum allowable probability of a lower threshold exception. The user of the system may also or alternatively specify an "upper threshold ceiling". The upper threshold ceiling is the maximum allowable probability of an upper threshold exception.

A suitable value for the upper and lower threshold ceilings may be 5%. Higher and lower values may be specified depending upon the particular work tasks an employee may be engaged in.

It may not be possible to meet all of the criteria for thresholds and threshold ceilings simply by adjusting the Poisson parameter. For example, if the lower threshold is 1, the upper threshold is 5 and the upper and lower threshold ceilings are 5%, then there is no Poisson parameter that will meet all of those criteria. Table 1 below shows the probabilities of each of the Poisson parameters 1, 3 and 5 having lower and upper threshold exceptions when the upper and lower thresholds are 1 and 5 respectively. FIGS. 5A to 5C use arrows and dotted lines to indicate the values of the Poisson distributions that are summed to give the probabilities of the exceptions.

TABLE 1

| Poisson Parameter | Probability of Lower Threshold exception (e.g. # messages less than 1) | Probability of Upper Threshold Exception (e.g. # messages more than 5) |
|---|---|---|
| 1 | 36.8% (item 502) | 0.1% (item 504) |
| 3 | 5.0% (item 512) | 8.4% (item 514) |
| 5 | 0.7% (item 522) | 37.0% (item 524) |

The Poisson parameter 3 comes close to meeting the criteria, except the probability of an upper threshold exception, 8.4%, is more than the upper threshold ceiling of 5%. A smaller Poisson parameter will lower the probability of an upper threshold exception, but the probability of a lower threshold exception will then be more than 5%. A larger Poisson parameter will have a lower probability of a lower threshold exception, but the probability of an upper threshold exception will then be more than 5%.

A solution to the problem is to use a "conditional Poisson parameter". A conditional Poisson parameter takes on a value based on the prior occurrence of a particular event. In this case, the particular event is that the number of messages already sent in a standard time period is equal to or greater than the lower threshold. If the number of messages already sent is less than the lower threshold, then the Poisson parameter is set to a first value. If the number of messages already sent is equal to or greater than the lower threshold, then the Poisson parameter is set to a second value. The first value of the Poisson parameter may be relatively high so that there is a high probability that at least the lower threshold number of messages will be sent. The second value of the Poisson parameter may be relatively low so that once the lower threshold number of messages are sent, the probability of more than the upper threshold number of messages being sent in the same standard time period will be low. The performance of a system using a conditional Poisson parameter can be modeled using Monte Carlo simulations.

Figure 10:
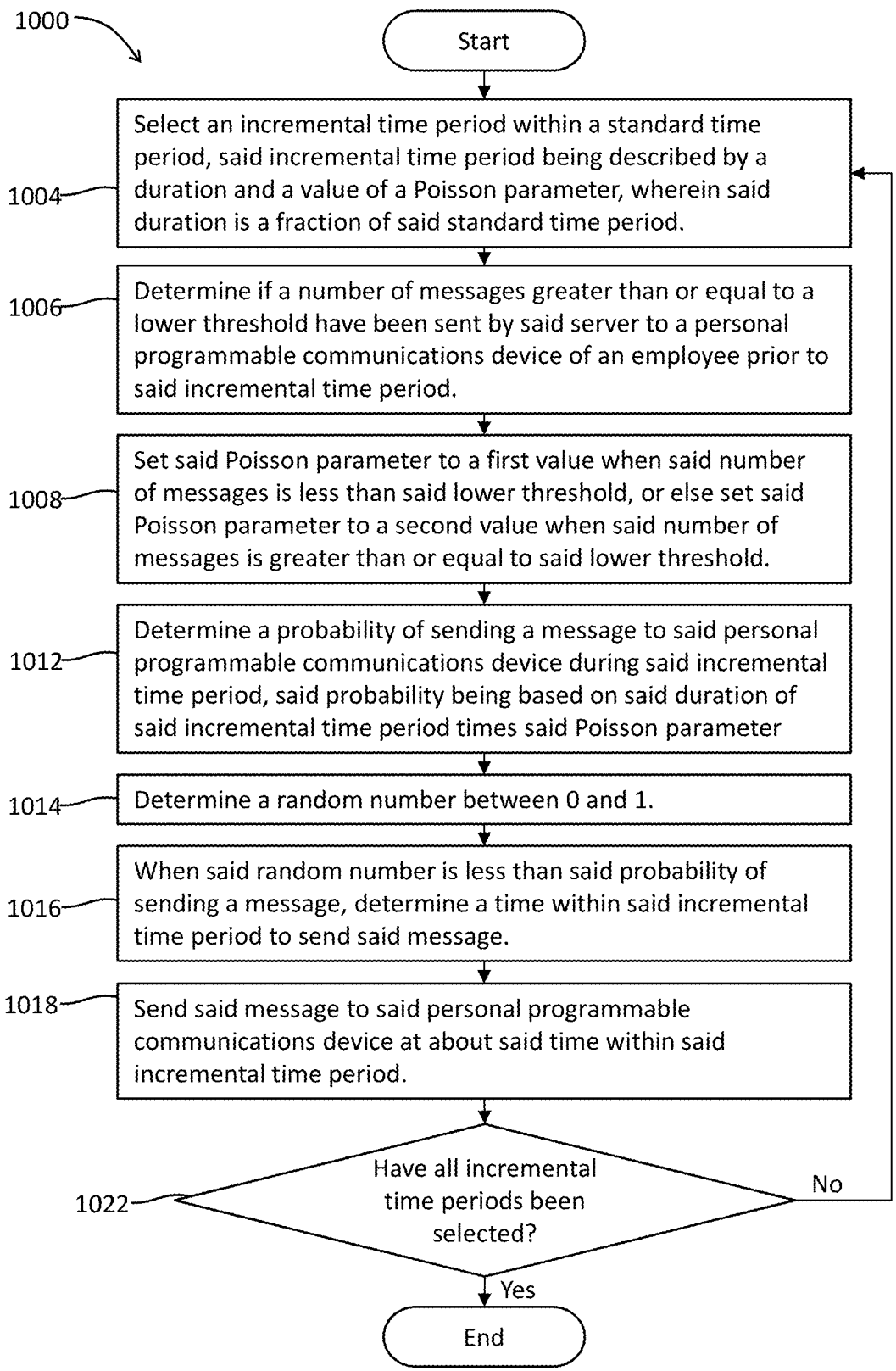
FIG. 10 is a flow chart of the steps to determine when a message is sent to an employee's personal programmable device for a conditional Poisson parameter.

Referring to system 100 of FIG. 1 and flow chart 1000 of FIG. 10, a suitable system directed to the practical application of sending a message to an employee at least a lower threshold number of times but not more than an upper threshold number of times during a standard time period comprises:
  a) a personal programmable communications device (e.g. items 134, 146, 144, 142, 122, 115, 117, or 124) that is with said employee when said employee is on said job; and
  b) a first server 104 in digital communication 102 with said personal programmable communications device
wherein:
  c) said first server is modified to automatically carry out the steps of:
    1) select 1004 an incremental time period within said standard time period, said incremental time period being described by a duration and a value of a Poisson parameter, wherein said duration is a fraction of said standard time period;
    2) determine 1006 if a number of messages greater than or equal to said lower threshold have been sent by said server to said personal programmable communications device of said employee prior to said incremental time period;
    3) set 1008 said Poisson parameter to a first value when said number of messages is less than said lower threshold, or else set said Poisson parameter to a second value when said number of messages is greater than or equal to said lower threshold;
    4) determine 1012 a probability of sending a message to said personal programmable communications device during said incremental time period, said probability being based on said duration of said incremental time period times said Poisson parameter;
    5) determine 1014 a random number between 0 and 1;
    6) when said random number is less than said probability of sending a message, determine 1016 a time within said incremental time period to send said message; and
    7) send 1018 said message to said personal programmable communications device at about said time within said incremental time period
  and wherein:
  d) said message is operable to physically cause said personal programmable communications device to issue an audible sound;
  e) said personal programmable communications device is operable to receive a security code from said employee in response to said audible sound to confirm that said employee is on said job at said location during said incremental time period;
  f) said first value of said Poisson parameter is set so that the probability of a lower threshold exception is less than or equal to a lower threshold ceiling; and
  g) said second value of said Poisson parameter is set so that the probability of an upper threshold exception is less than or equal to an upper threshold ceiling.

The steps 1004 to 1018 may be repeated 1022 until all incremental time periods have been selected. The steps may be executed in real time or executed in advance of a given standard time period. The personal programmable communications device may be modified to carry out the steps independently of the server and simply report back the results of the employee's actions to the server.

Figures 6A, 6B:
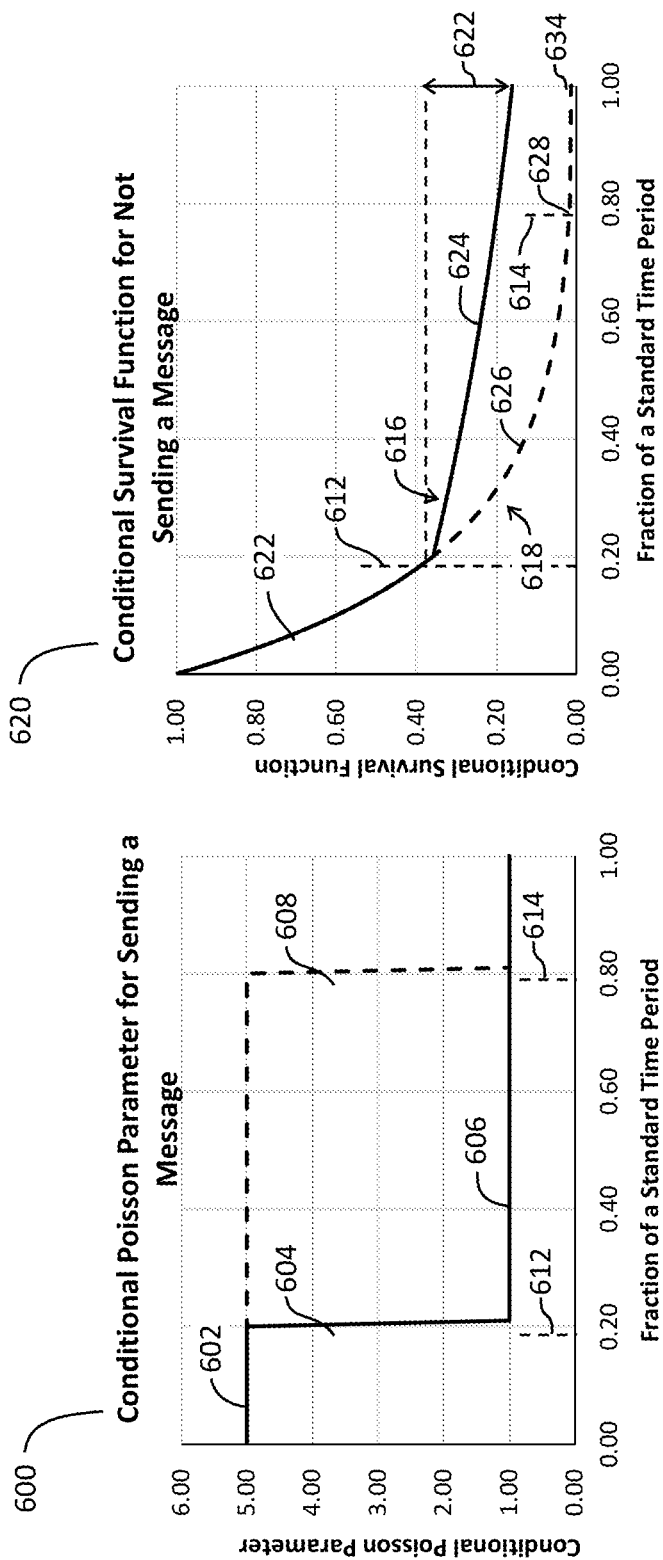
FIG. 6A is a graph of a conditional Poisson parameter versus fraction of a standard time period where the Poisson parameter has a first value until a message is sent and a second value after a message is sent.
FIG. 6B is a graph of a conditional survival function associated with the conditional Poisson parameter of FIG. 6A.

FIG. 6A is a graph 600 of a conditional Poisson parameter (e.g. 604 or 608 depending upon when the first message is sent) versus fraction of a standard time period where the Poisson parameter has a first value 602 until a message is sent (e.g. 612 or 614). After the first message is sent, the Poisson parameter is set to a second value 606 for the remainder of the standard time period.

FIG. 6B is a graph 620 of a conditional survival function (e.g. 616 or 618 depending upon when the first message is sent) associated with the conditional Poisson parameter of FIG. 6A. The initial portion 622 of the survival function decreases quickly due to the high value (e.g. 5) of the first value of the Poisson parameter. Once a first message is sent (e.g. 612), the second portion (e.g. 624) of the survival function decreases more slowly due to the lower second value (e.g. 1) of the Poisson parameter. The proportional change 622 of the second portion of the survival function indicates the probability that at least one more additional message will be sent. If the first message is sent at time 604 (fraction of standard time period=0.2), then the proportional change in survival function is about 0.18/0.38 or about 47%. Thus, there is about a (100%−47%) or 53% probability that at least one more message will be sent. An employee, therefore, is unlikely to feel that just because a first message was sent, there won't be a second message. If the first message isn't sent until later (e.g. 614), then the first portion of the survival function continues 626 to decrease rapidly to a very low value 628. Thus, the probability of an employee receiving no message during the standard time period is very low. If the first message isn't received until near the end of the standard time period, then any further decrease 634 in the survival function is minimal due to the low second value of the Poisson parameter and the short amount of time remaining in the standard time period.

Figures 7A, 7B, 7C:
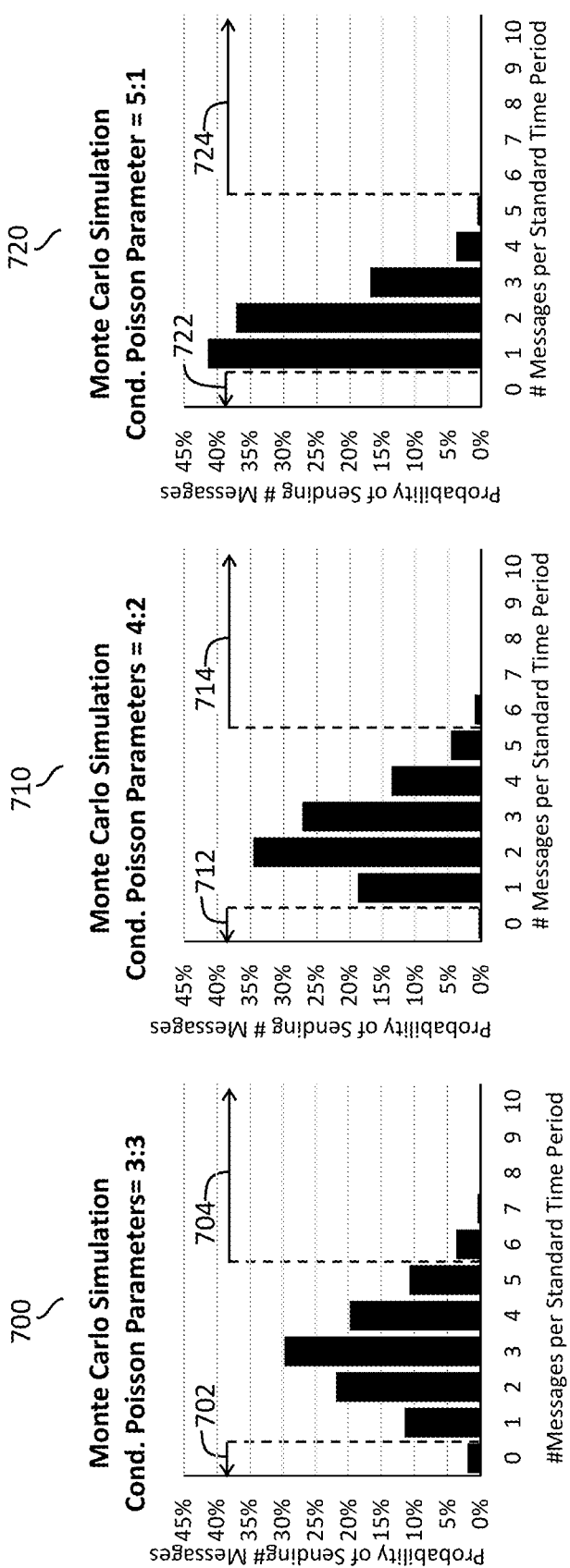
FIGS. 7A to 7C are graphs of Monte Carlo simulations of the conditional Poisson distribution associated with different values of pairs of conditional Poisson parameters.

Monte Carlo simulations, along with other numerical approximation techniques, can be used to model the performance of a system using conditional Poisson parameters. FIGS. 7A to 7C are graphs 700, 710, and 720 of Monte Carlo simulations of the conditional Poisson distributions associated with different values of pairs of conditional Poisson parameters. The pairs, 3:3, 4:2 and 5:1 are indicated in the titles. The first number in a pair is the first value of the Poisson parameter. The second number in a pair is the second value. The pair 3:3 is a special case where the first value and the second value are the same. This is simply a normal Poisson distribution and can be used as a check on the simulation.

One thousand iterations were run for each simulation. The calculated upper and lower threshold exception probabilities are shown in table 2 below. The values of the calculated # messages probabilities summed to determine the exception probabilities are indicated in FIGS. 7A to 7C. In this example, the lower threshold is 1 and the upper threshold is 5.

TABLE 2

| Conditional Poisson Parameters | Probability of Lower Threshold Exception (e.g. # messages less than 1) | Probability of Upper Threshold Exception (e.g. # messages more than 5) |
| --- | --- | --- |
| 3:3 | 2.0% (item 702) | 4.3% (item 704) |
| 4:2 | 0.4% (item 712) | 1.1% (item 714) |
| 5:1 | 0.2% (item 722) | 0.1% (item 724) |

The values of the threshold exception probabilities for the conditional Poisson parameters 3:3 are different than the theoretical values shown in table 1 for a Poisson parameter of 3. This indicates the accuracy of running the Monte Carlo simulation only 1,000 times. A larger number of times, such as 10,000 or more may be appropriate for more accurate results.

If the upper and lower threshold ceilings are set to 5%, then both the conditional Poisson parameters 4:2 and 5:1 would be suitable. A user may choose between these pairs of conditional Poisson parameters by looking at how the simulated probabilities of sending a message vary over time.

FIGS. 8A to 8C are graphs 800, 810, 820 of Monte Carlo simulations of the probability of a message being sent in the different incremental time periods for different values of conditional Poisson parameter pairs. The Poisson parameter pairs are indicated in the titles. They are the same pairs as for FIGS. 7A to 7C. FIG. 8A for the conditional Poisson parameter pair 3:3 indicates that the probability of sending a message is about the same at the beginning 802 of a standard time period and at the end 804 of a standard time period. This is expected since the first and second value of the Poisson parameter are the same. The variation observed in the simulated probabilities for each incremental time period indicate the normal variation expected for 1,000 runs of the simulation. The variation would be reduced if the simulation were run more times. Nonetheless, running the simulation only 1,000 times has a benefit. Running the simulation for only 1,000 times gives a user a sense of the sort of normal variation an employee might see in the number of messages in a given incremental time period over the course of three years at about 300 shifts per year. Not all the values are the same, but this does not indicate that a given incremental time period is preferred.

FIG. 8B shows that an employee will see more messages at the beginning 812 of a standard time period than at the end 814 of a standard time period for a Poisson parameter pair of 4:2. The difference is about double. FIG. 8C shows a more pronounced difference at the beginning 822 of a standard time period than at the end 824 of the standard time period. If an additional design goal of the system is to have a more uniform distribution of messages over the course of a standard time period, then a user might select the Poisson parameter pair of 4:2 over that of 5:1.

Any number of values of Poisson parameter may be conditionally selected over the course of a standard time period depending upon the requirements of the system.

The systems described herein may be suitable for any situation where verification is needed. A system might be used, for example, to validate the functioning of any automated physical system. An advantage of randomly sending validation messages in physical systems is that there is a greater chance of detecting periodic malfunctioning. For example, if a remote solar power system's functioning were checked periodically, such as daily, then a daily periodic malfunction might be missed. Randomly sent messages would be more likely to detect such a periodic malfunction.

Resettable Poisson Parameter

As indicated above, it may be desirable to minimize the disturbance of an employee immediately after the employee checks in for work during a standard time period. Similarly, it may be desirable to minimize the disturbance of an employee immediately after an employee has been sent a message. Both of these goals can be achieved using a "resettable Poisson parameter". As used herein, a resettable Poisson parameter is a conditional Poisson parameter where the value of the Poisson parameter at any time is determined by the elapsed time since the last message was sent. As used herein, the beginning of a standard time period is considered to be the time the last was sent message if no prior message has been sent.

The Poisson parameter may be an increasing function of time so that it has a low value immediately after a message is sent. The value then increases with time so that the likelihood of a message being sent goes up. A linearly increasing function of time, such as a Weibull distribution with a shape parameter of 2, may be suitable. Any increasing function of time that is described at least in part by a Weibull distribution with a shape parameter of 1 or greater may be used.

"Minimizing the disturbance of an employee immediately after a last message was sent" can be quantitatively defined as the condition that the probability of a message being sent during a do-not-disturb time period is less than a do-not-disturb threshold. The do-not-disturb time period occurs immediately after the last message was sent. A suitable value for a do-not-disturb time period might be 0.1 times the standard time period. A suitable value for a do-not-disturb ceiling might be 10%. Other values for the do-not-disturb time period or the do-not-disturb ceiling may be suitable for particular situations.

Figure 11:
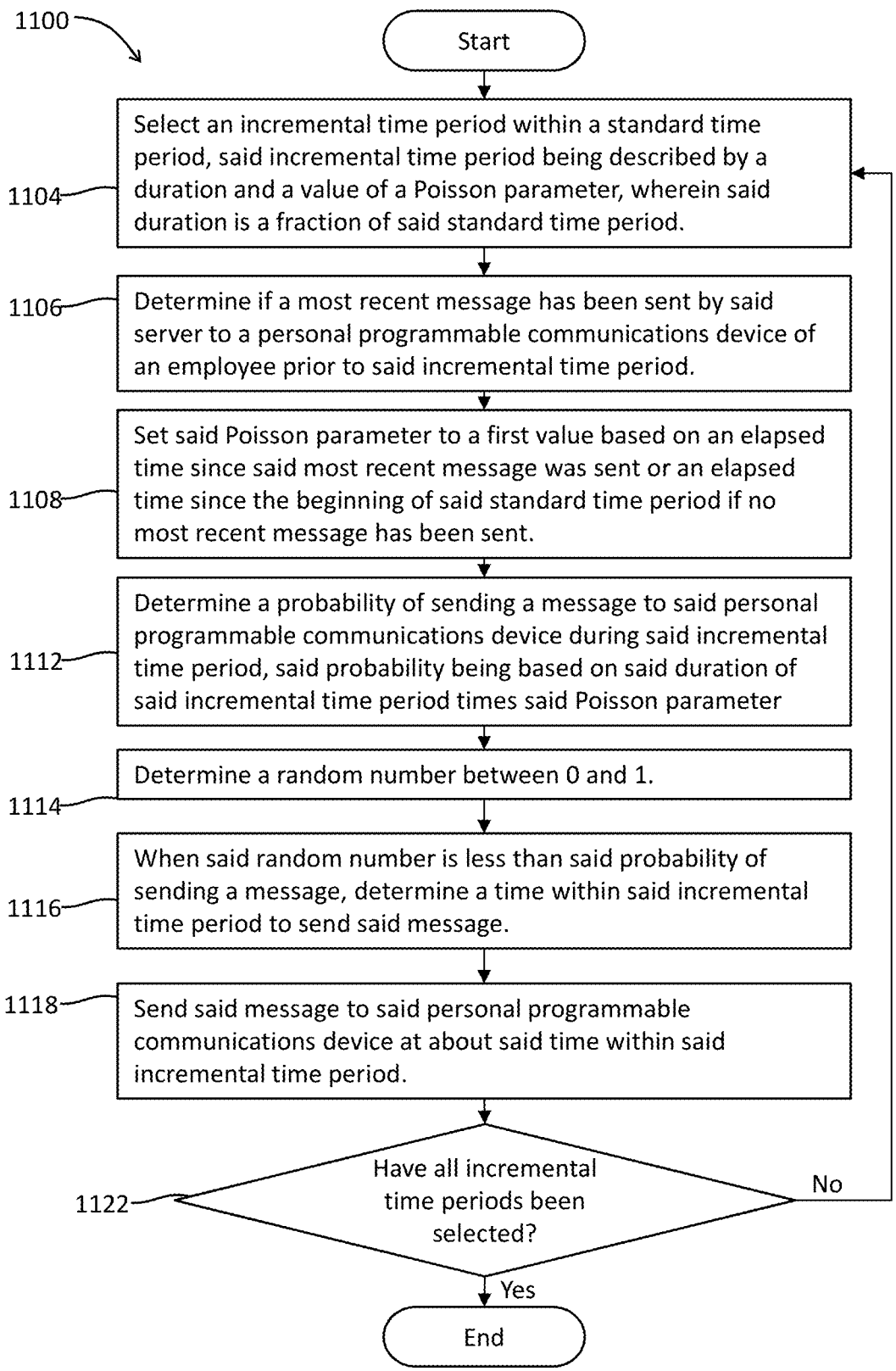
FIG. 11 is a flow chart of the steps to determine when a message is sent to an employee's personal programmable device for a resettable Poisson parameter.

Referring to system 100 of FIG. 1 and flow chart 1100 of FIG. 11, a suitable system directed to the practical application of not unduly disturbing the employee immediately after a last message has been sent comprises:

h) a personal programmable communications device (e.g. items 134, 146, 144, 142, 122, 115, 117, or 124) that is with said employee when said employee is on said job; and i) a first server 104 in digital communication 102 with said personal programmable communications device wherein:

j) said first server is modified to automatically carry out the steps of:

8) select 1104 an incremental time period within said standard time period, said incremental time period being described by a duration and a value of a Poisson parameter, wherein said duration is a fraction of said standard time period;

9) determine 1106 if a most recent message has been sent by said server to said personal programmable communications device of said employee prior to said incremental time period;

10) set 1108 said Poisson parameter to a first value based on an elapsed time since said most recent message was sent or an elapsed time since the beginning of said standard time period if no most recent message has been sent;

11) determine 1112 a probability of sending a message to said personal programmable communications device during said incremental time period, said probability being based on said duration of said incremental time period times said Poisson parameter;

12) determine 1114 a random number between 0 and 1;

13) when said random number is less than said probability of sending a message, determine 1116 a time within said incremental time period to send said message; and 14) send 1118 said message to said personal programmable communications device at about said time within said incremental time period and wherein:

k) said message is operable to physically cause said personal programmable communications device to issue an audible sound;

l) said personal programmable communications device is operable to receive a security code from said employee in response to said audible sound to confirm that said employee is on said job at said location during said incremental time period; and m) said first value of said Poisson parameter is an increasing function of time after said most recent message has been sent such that:

i) the probability of sending a message during a do-not-disturb time period immediately after the most recent message has been sent is less than a do-not-disturb ceiling.

The steps 1104 to 1118 may be repeated 1122 until all incremental time periods have been selected. The steps may be executed in real time or executed in advance of a given standard time period. The personal programmable communications device may be modified to carry out the steps independently of the server and report back the results of the employee's actions to the server.

FIG. 12A is a graph 1200 of a resettable Poisson parameter (e.g. 1204 or 1208 depending upon when the first message is sent) versus fraction of a standard time period. The Poisson parameter is described by an increasing function of time 1202 until a message is sent (e.g. 1212 or 1214). In this instance, the increasing function of time is linear with an initial value of 0 and a slope of 6. Hence it is described by a Weibull distribution with a shape parameter of 2 and a scale parameter of 6.

After a message is sent, the Poisson parameter is described by the same increasing function of time but with time reset so that the function (e.g. 1206 or 1207) is based on the elapsed time since when the most recent message was sent. If another message occurs, then the time will be reset again to when the new most recent message was sent.

In alternative embodiments, different functions of time may be used. For example, if it is essential that at least one message be sent during a standard time period, then the increasing function of time may be set to go to infinity as time goes to 1 (i.e. the full duration of the standard time period). If it is essential that no more messages be sent after a critical number of messages are sent, the function of time may be set to zero after the critical number of messages are sent.

FIG. 12B is a graph 1220 of a resettable survival function (e.g. 1216 or 1218) associated with the resettable Poisson parameter of FIG. 12A. The initial portion 1222 of the survival function decreases slowly due to the initially low value of the Poisson parameter. The survival function then decreases more rapidly 1223 due to the increasing Poisson parameter. Once a first message is sent (e.g. 1212), the survival function once again initially decreases more slowly (e.g. 1213) since the time has been reset to zero. The survival function once again decreases more rapidly 1215 due to the increasing Poisson parameter.

Figures 13A, 13B, 13C:
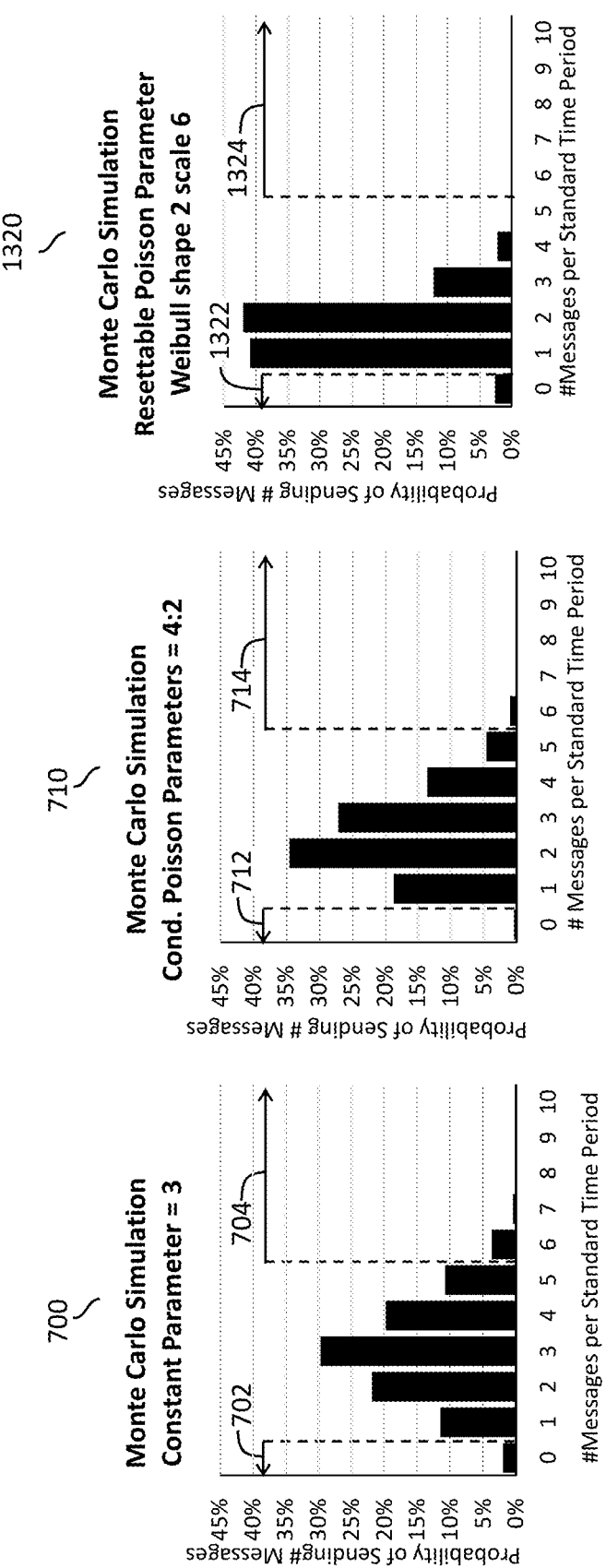
FIG. 13A is a Monte Carlo simulation of a constant Poisson parameter.
FIG. 13B is a Monte Carlo simulation of a conditional Poisson parameter.
FIG. 13C is a Monte Carlo simulation of a resettable Poisson parameter.

Monte Carlo simulations, along with other numerical approximation techniques, can be used to model the performance of a system using resettable Poisson parameters. FIGS. 13A and 13B are the graphs 700 and 710 from FIGS. 7A and 7B. These graphs show the probabilities of sending a certain number of messages (i.e. # messages) in a standard time period. FIG. 13A has a constant Poisson parameter of 3 (graph 700). FIG. 13B has a conditional Poisson parameter of 4:2 (graph 710). The title of graph 700 has been modified relative to the version in FIG. 7A to indicate that it is for a constant Poisson parameter of 3 (i.e. conditional Poisson parameter 3:3).

FIG. 13C shows a graph 1320 of the probabilities of sending a certain number of messages in a standard time period with a resettable Poisson parameter. The resettable Poisson parameter is described by an increasing function of time. The increasing function of time is described by a Weibull distribution with a shape parameter of 2 (i.e. linearly increasing) and a scale parameter of 6.

One thousand iterations were run for each simulation. The calculated upper and lower threshold exception probabilities are shown in table 3 below. In this example, the lower threshold is 1 and the upper threshold is 5. The lower and upper threshold ceilings are both 5%.

TABLE 3

| Poisson Parameters | Probability of Lower Threshold Exception (e.g. # messages less than 1) | Probability of Upper Threshold Exception (e.g. # messages more than 5) |
|---|---|---|
| Constant 3 | 2.0% (item 702) | 4.3% (item 704) |
| Conditional 4:2 | 0.4% (item 712) | 1.1% (item 714) |
| Resettable Weibull shape 2, scale 6 | 2.6% (item 1322) | 0.0% (item 1324) |

The probabilities of a lower threshold exception or upper threshold exception for the resettable Poisson parameter are below the lower and upper threshold ceilings. There is the additional and surprising benefit of a narrower distribution relative to the constant Poisson parameter or conditional Poisson parameter examples. Thus, the upper threshold could be lowered to 3 and the probability of an upper threshold exception (2.3%) would still be below the upper threshold ceiling (5%).

Figures 14A, 14B, 14C:
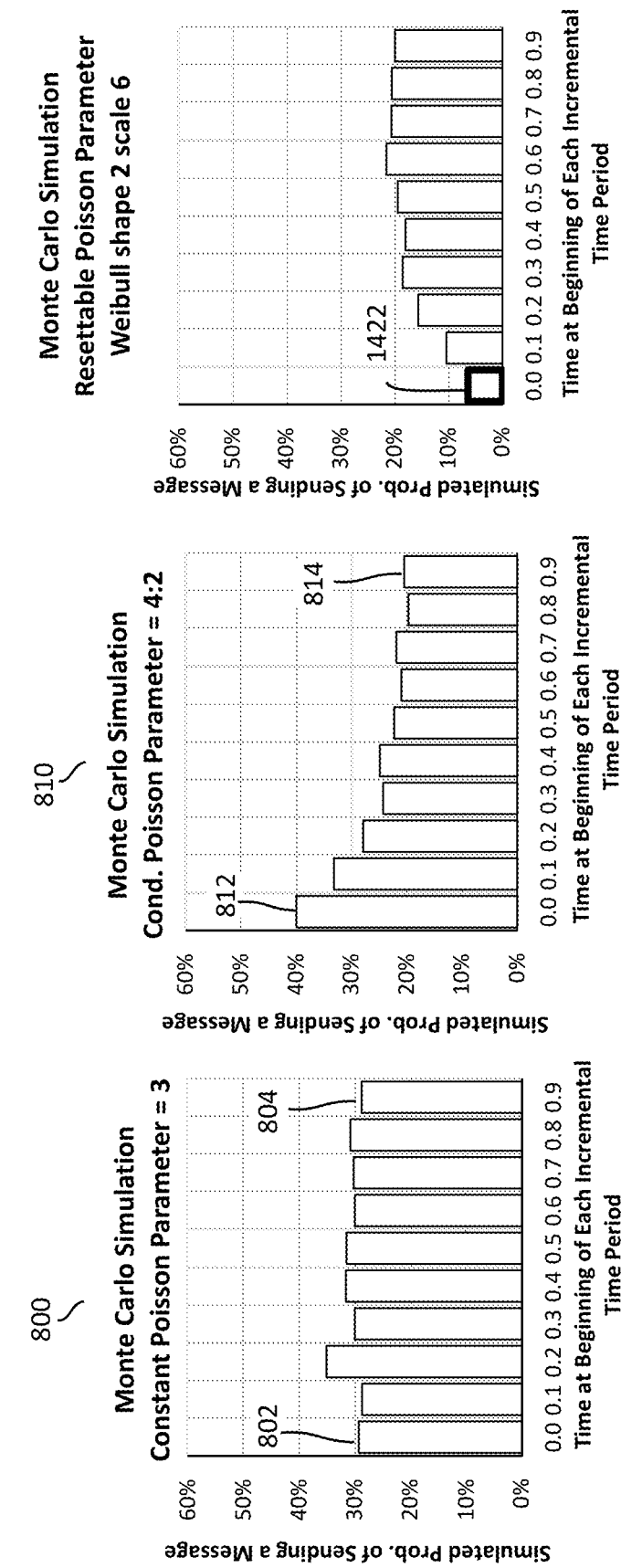
FIG. 14A is a graph of a simulated constant Poisson parameter versus time.
FIG. 14B is a graph of a simulated conditional Poisson parameter versus time.
FIG. 14C is a graph of a simulated resettable Poisson parameter versus time.

FIGS. 14A and 14B are graphs 800, 810 of Monte Carlo simulations of the probability of a message being sent in the different incremental time periods for the Poisson parameters of FIGS. 13A to and 13B. FIG. 14C is a graph 1420 of a Monte Carlo simulation of the probability of a message being sent in different incremental time periods for the resettable Poisson parameter of FIG. 13C. An initial do-not-disturb period 1422 has a probability of a message being sent of 6.4%. This is less than the do-not-disturb ceiling of 10%. Hence this example of a resettable Poisson parameter meets all three criteria related to the lower threshold ceiling, upper threshold ceiling and do-not-disturb ceiling.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

We claim:

1. A system directed to the practical application of automatically verifying in a computationally efficient manner whether or not an employee is actually on a job at a location during a standard time period, said system comprising:
   a) a personal programmable communications device that is with said employee when said employee is on said job; and
   b) a first server in digital communication with said personal programmable communications device wherein:
c) said first server is modified to automatically carry out the steps:
   1) select an incremental time period within said standard time period, said incremental time period being described by a duration and a value of a Poisson parameter, wherein said duration is a fraction of said standard time period;
   2) determine a probability of sending a message to said personal programmable communications device during said incremental time period, said probability being based on said duration of said incremental time period times said Poisson parameter;
   3) determine a random number between 0 and 1;
   4) when said random number is less than said probability of sending a message, determine a time within said incremental time period to send said message; and
   5) send said message to said personal programmable communications device at about said time within said incremental time period and wherein:
d) said message is operable to physically cause said personal programmable communications device to issue an audible sound; and
e) said personal programmable communications device is operable to receive a security code from said employee in response to said audible sound to confirm that said employee is on said job at said location during said incremental time period.

2. The system of claim 1 wherein said Poisson parameter has a value of about 3.

3. The system of claim 1 wherein said Poisson parameter has a first value during a first incremental time period and a second value during a second incremental time period.

4. The system of claim 3 wherein said first value is greater than said second value.

5. The system of claim 1 wherein said Poisson parameter varies with time and is described by a Weibull distribution.

6. The system of claim 5 wherein said Poisson parameter increases linearly with time.

7. The system of claim 1 wherein said duration times said Poisson parameter is equal to 0.3 or less and said probability of sending a message is set equal to said duration times said Poisson parameter.

8. The system of claim 1 which is further directed to the practical application of sending said message to said employee at least a lower threshold number of times but not more than an upper threshold number of times during said standard time period wherein said steps further comprise the steps of:
   a) prior to determining said probability of sending a message, determine if a number of messages greater than or equal to said lower threshold have been sent by said server to said personal programmable communications device of said employee prior to said incremental time period; and
   b) set said Poisson parameter to a first value when said number of messages is less than said lower threshold, or else set said Poisson parameter to a second value when said number of messages is greater than or equal to said lower threshold wherein:
c) said first value of said Poisson parameter is set so that the probability of a lower threshold exception is less than or equal to a lower threshold ceiling; and d) said second value of said Poisson parameter is set so that the probability of an upper threshold exception is less than or equal to an upper threshold ceiling.

9. The system of claim 8 wherein said first value of said Poisson parameter is greater than said second value of said Poisson parameter.

10. The system of claim 8 wherein said first value of said Poisson parameter is in the range of 4 to 5 and said second value of said Poisson parameter is in the range of 1 to 2.

11. The system of claim 8 wherein said lower threshold is 1.

12. The system of claim 8 wherein said upper threshold ceiling and said lower threshold ceiling are each 5%.

13. The system of claim 8 wherein said steps further comprise the steps of:
a) determine said probability of said lower threshold exception using a Monte Carlo simulation; and
b) determine said probability of said upper threshold exception using a Monte Carlo simulation.

14. The system of claim 13 wherein said Monte Carlo simulation is run 1,000 or more times.

15. The system of claim 1 wherein:
a) said location is within a building shielded from external GPS signals but covered by an internal Wi-Fi network; and
b) said personal programmable communications device confirms that it is located at about said location by connecting to said internal Wi-Fi network.

16. The system of claim 1 wherein said standard time period is an eight-hour shift.

17. The system of claim 1 wherein said fraction is 1/10 or less of said standard time period.

18. The system of claim 1 wherein said time within said incremental time period is randomly selected.

19. The system of claim 1 wherein said steps further comprise the step of:
a) use machine learning to automatically adjust the Poisson parameters of said incremental time period when the frequency of employees failing to respond to messages sent during said incremental time period indicates an increased need to verify that an employee is on the job during said incremental time period.

20. The system of claim 1 which is further directed to the practical application of minimizing the disturbance of an employee immediately after a message is sent wherein said steps further comprise the steps of:
a) prior to determining said probability of sending a message, determine if a most recent message has been sent by said server to said personal programmable communications device of said employee prior to said incremental time period; and
b) set said Poisson parameter to a first value based on an elapsed time since said most recent message was sent or an elapsed time since the beginning of said standard time period if no most recent message has been sent
wherein said first value of said Poisson parameter is an increasing function of time after said most recent message has been sent such that:
c) the probability of sending a message during a do-not-disturb time period immediately after the most recent message has been sent is less than a do-not-disturb ceiling.

21. The system of claim 20 wherein:
a) said do-not-disturb time period is about 0.1 times said standard time period; and
b) said do-not-disturb ceiling is about 10%.

22. The system of claim 20 wherein said increasing function of time is described at least in part by a Weibull distribution with a shape parameter greater than 1.

23. The system of claim 22 when the shape parameter of said Wiebull distribution is about claim 2.

24. The system of claim 22 wherein said increasing function of time is selected such that:
a) the probability of a lower threshold exception is less than or equal to a lower threshold ceiling; and
b) the probability of an upper threshold exception is less than or equal to an upper threshold ceiling.

* * * * *

UNITED STATES PATENT AND TRADEMARK OFFICE
CERTIFICATE OF CORRECTION

| | | |
|---|---|---|
| PATENT NO. | : 10,719,793 B1 | Page 1 of 1 |
| APPLICATION NO. | : 16/239649 | |
| DATED | : July 21, 2020 | |
| INVENTOR(S) | : Smith et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 21 days.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*